United States Patent [19]

Glenn

[11] Patent Number: 4,729,030
[45] Date of Patent: Mar. 1, 1988

[54] NOISE REDUCTION IN VIDEO DISPLAY APPARATUS

[75] Inventor: William E. Glenn, Ft. Lauderdale, Fla.

[73] Assignee: New York Institute of Technology, Old Westbury, N.Y.

[21] Appl. No.: 53,572

[22] Filed: May 21, 1987

Related U.S. Application Data

[63] Continuation of Ser. No. 557,941, Dec. 5, 1983, abandoned.

[51] Int. Cl.$^4$ .................. H04N 5/74; H04N 5/213
[52] U.S. Cl. ........................... 358/230; 358/167; 358/233
[58] Field of Search ............. 358/230, 233, 234, 241, 358/235, 36, 59, 167; 340/782, 798

[56] References Cited

U.S. PATENT DOCUMENTS

| | | | |
|---|---|---|---|
| 3,882,271 | 5/1975 | Glenn | 358/233 |
| 4,064,530 | 12/1977 | Kaiser | 358/167 |
| 4,380,755 | 4/1983 | Endlicher | 358/167 |
| 4,494,140 | 1/1985 | Michael | 358/167 |

Primary Examiner—Tommy P. Chin
Attorney, Agent, or Firm—Martin M. Novack

[57] ABSTRACT

An analog video frame store, resident in certain types of video displays, is used to obtain video signal noise reduction. A frame storage system has an array of semiconductor-controlled storage units for receiving and storing frames of video information as a pattern of stored charge. A circuit is provided for applying sampled portions of the video signals to respective ones of the elemental storage units of the frame storage system. The circuit is operative to apply the sampled portions of the video signals to their respective semiconductor unit storage regions with a time constant for each particular storage unit that depends upon the difference between the sampled signal level being applied to the particular storage unit and the signal level stored at the particular storage unit. The stored charge is converted into a viewable image by using a deformable material whose shape is affected by the charge pattern and an optical subsystem for generating the viewable image as a function of the shape of the deformable material.

22 Claims, 6 Drawing Figures

NOISE REDUCTION IN VIDEO DISPLAY APPARATUS

This is a continuation of U.S. application Ser. No. 557,941, filed Dec. 5, 1983, now abandoned.

BACKGROUND OF THE INVENTION

This invention relates to video display systems and, more particularly, to improvements in the type of video display which employs a deformable material having deformations that depend upon a stored charge pattern and an optical subsystem for converting the deformations into a viewable image.

In recent years there have been developed techniques for displaying video information by storing a charge pattern representative of a video frame in a frame store and utilizing the charge pattern to modify a characteristic of a material. The modified characteristic of the material is then used to obtain a viewable image. For example, in my U.S. Pat. No. 3,882,271, there is disclosed an apparatus wherein a charge pattern on a special semiconductor frame store is used to obtain deformations of a deformable material disposed thereon. An optical subsystem, such as a Schleiren optical system, can then be utilized to convert the pattern of deformations (or "ripples") in the deformable material into a viewable image.

In other types of proposed systems, different media can be utilized for obtaining the viewable image. For example, in one such system the charge pattern can be used to control a liquid crystal material so that its light-reflecting properties are in a pattern that depends upon the stored charge pattern. In another such proposed system, the stored charge pattern can be used to control the amount of light output from electroluminescent media.

It is known in the video art that recursive filtering can be utilized to reduce noise in a video signal. In my U.S. Pat. No. 4,064,530, there is disclosed a digital video noise reduction system wherein a digital representation of the present instantaneous video signal is combined with a digital representation of video signal stored during previous frames to obtain a combined digital video signal that is converted back to analog form and ultimately displayed. The relative "weighting" of the present and previous signals that are combined at each instant (i.e., for each video pixel) is determined by a "motion detection" control signal. The motion detector portion of the system uses a digital comparator that is operative to compare the digital value (i.e., amplitude) of the present pixel with its counterpart in the stored video in order to determine the degree of "motion" at the particular position of the picture. If the new pixel value is close to the old pixel value, then little motion is attributed to this pixel of the image during the latest frame interval. In such case, the motion detector control signal operates to weight the above-referenced combination such that it includes a substantial fraction of the stored "old" picture information. For example, ¾ of the previous frame signal may be combined with the unity complement fraction (i.e., ¼), of the present "new" video signal. If, however, the motion detection operation reveals a relative dissimilarity between the old and new pixel values, significant "motion" is indicated at the particular position of the image being processed. In such case a motion detection signal is generated and used to more heavily weight the fraction of "new" video information contributed to forming the combined signal. For example, the fractions used may be ¾ of "new" video signal to ¼ "old" video signal. The overall noise reducer system thereby operates to eliminate noise most effectively from those portions of the image in which there is little or no motion. However, when motion is present in part of an image, the averaging in of old information would cause the appearance of "smearing" of the ultimately displayed video, so the noise reduction is automatically reduced or eliminated in those portions of the video field in which significant motion is detected.

It would be desirable to have a recursive filtering type of noise reduction system in most video receivers, but these units are typically expensive, and their cost has been a prohibitive factor with regard to consideration of employment of such noise reduction systems in relatively low cost television receivers or displays of the type that are most prevalent in home and office applications.

It is an object of the present invention to provide, at incrementally reasonable cost, a video noise reduction capability in the above-described type of video display wherein there already exists a means, such as a non-digital (analog) memory, for storing a frame of charge pattern.

SUMMARY OF THE INVENTION

The present invention makes use of the analog video frame store resident in certain types of video displays, in conjunction with relatively simple circuitry, to obtain video signal noise reduction.

The invention is directed to an apparatus for generating images represented by frames of electronic video signals. In accordance with an embodiment of the invention, a frame storage means is provided, the frame storage means having an array of semiconductor-controlled storage units for receiving and storing frames of video information as a pattern of stored charge. In the illustrated embodiment hereof, the charge storage regions also serve as "display" regions in that the charge is stored in the capacitance between a semiconductor region of each elemental unit and a conductive layer that is spaced from the regions. Circuit means are provided for applying sampled portions of the video signals to respective ones of the elemental storage units of the frame storage means. In accordance with an important feature of the invention, the circuit means is operative to apply the sampled portions of the video signals to their respective semiconductor unit storage regions with a time constant for each particular storage unit that depends upon the difference between the sampled signal level being applied to the particular storage unit and the signal level stored at the particular storage unit. Means are also provided for converting the stored charge pattern into a viewable image, said means including a material having a characteristic which is affected by the charge pattern, and an optical subsystem for generating the viewable image as a function of the characteristic of the material. In the embodiments hereof, the material is a deformable material which is deformed by the charge pattern, and the optical subsystem is a Schleiren type of optical system.

The time constant of the circuit means is in an inverse relationship to the difference between the sampled signal level being applied to the particular storage unit and the signal level stored at that particular storage unit; i.e., the greater the difference in signal level, the shorter the time constant. In this manner, more "new" signal is applied if the "new" signal is much different than the presently stored signal at a particular element and, conversely, little "new" signal is applied if the "new" signal is close in value to the presently stored signal, thereby tending to reduce noise in the ultimately displayed video signal.

In the illustrated embodiment, the circuit means is operative to vary its time constant by varying the resistance through which the sampled video signal is applied to a storage unit. In particular, a plurality of resistors are coupled in series, and a pair of back-to-back diodes are coupled across each resistor.

Further features and advantages of the invention will become more readily apparent from the following detailed description when taken in conjunction with the accompanying drawings.

DESCRIPTION OF THE PREFERRED EMBODIMENT

Figure 1:
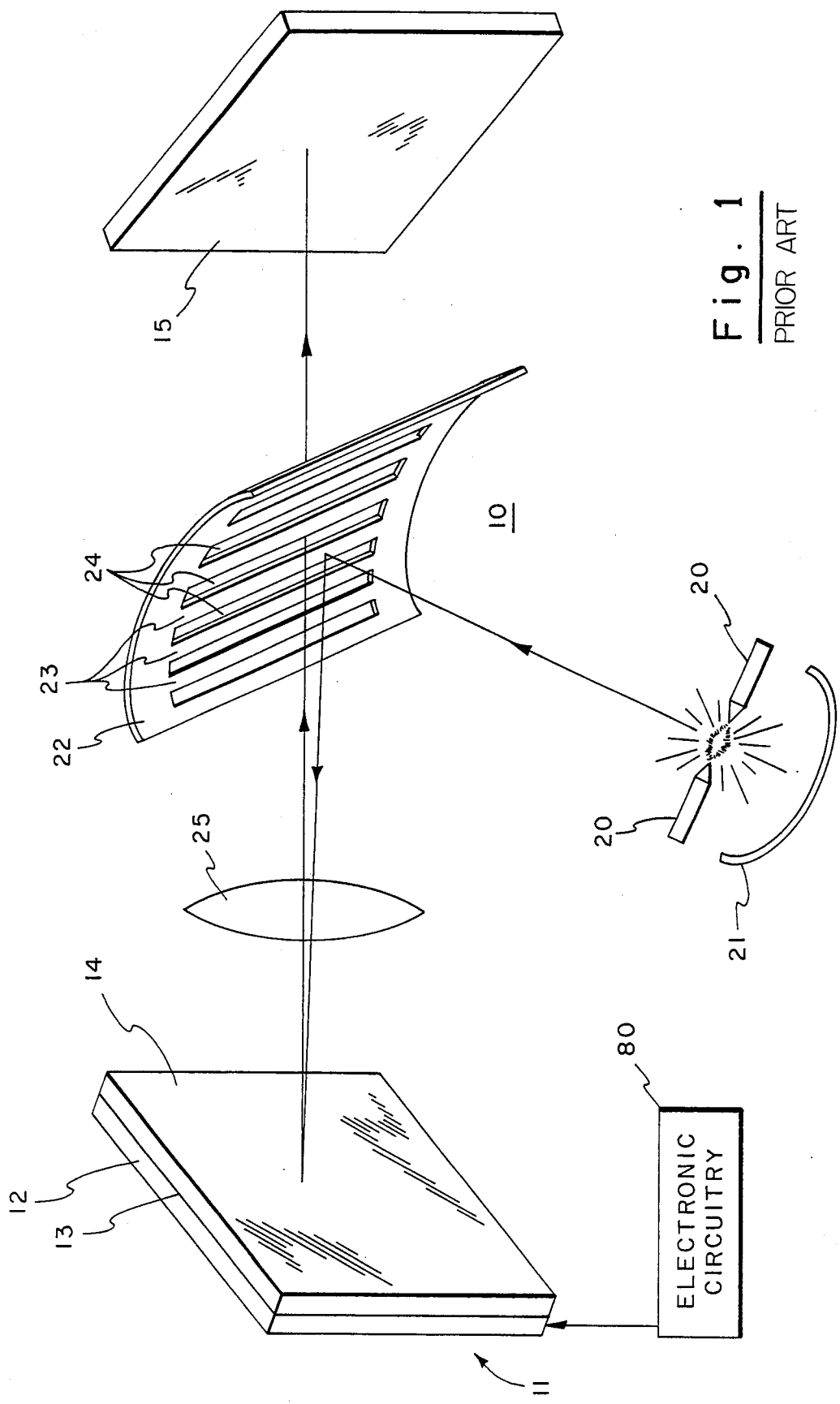
FIG. 1 is a simplified schematic diagram of an apparatus which, when taken together with the circuitry to be described, constitutes an embodiment of the invention.

Referring to FIG. 1, there is shown a simplified schematic diagram of an apparatus 10 in accordance with an embodiment of the invention. A semiconductor substrate 11 has an array of semiconductor controlled storage units formed in a surface 12 thereof and is provided with a layer of deformable material 13 which covers the surface 12. A reflective layer 14 of conductive material is disposed over the deformable layer 13. The semiconductor array, and associated circuitry 80, which includes features of the invention to be described in detail hereinbelow, receives and samples a video signal, the samples ultimately being stored as a charge pattern on the surface 12 of semiconductor 11. The electric field associated with the charge pattern deforms the deformable material 13 so that information is contained in the reflective layer 14 in the form of depressions or ripples which are similar to a phase diffraction grating. This information is then displayed on a screen 15, such as by using a Schlieren type of optical system.

The optical system depicted in FIG. 1 is of the type disclosed in my U.S. Pat. No. 3,084,590. In this sytem arc electrodes 20 generate an intense light source that is directed by a curved mirror 21 over a masking system 22 which includes a plurality of reflecting bars 23 separated by transparent areas or slits 24. The masking system 22 is positioned so that the light reflected from the bars 23 is transmitted toward a lens 25 where it is focused into parallel rays. These rays are incident on the deformed reflective surface 14 and are reflected back through the lens 25 toward the masking system 22. If, at a given instant, there were no depressions on the surface 14 to divert the light rays, the rays effectively emanating from each bar 23 would be focused by lens 25 on the same bar and no light would be incident on the screen 15. However, if there are depressions in the surface 14 they will act as diffraction gratings and some light will be diffracted and ultimately pass through the slits 24. The portion of a light ray transmitted through a particular slit depends on the amplitude of the infinitesimal diffraction grating from which the ray was diffracted. Thus, an appropriate pattern of diffraction gratings, resulting from a selected charge pattern, will yield a desired image on the screen 15. In the illustrated embodiments the charge pattern is derived from an array of semiconductor units.

Figure 2A:
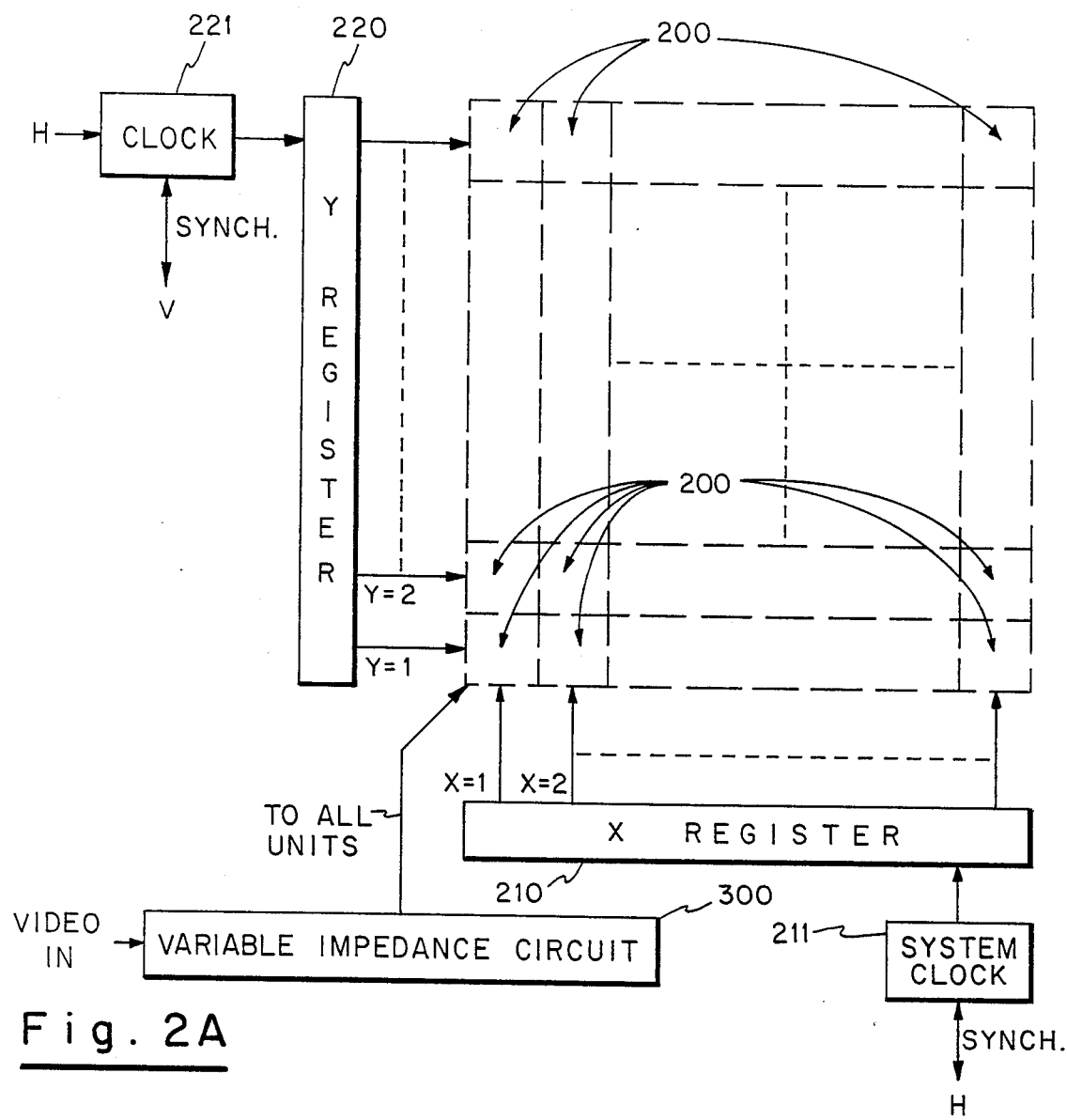
FIG. 2A is a diagram of an improved apparatus in accordance with an embodiment of the invention.
Figure 2B:
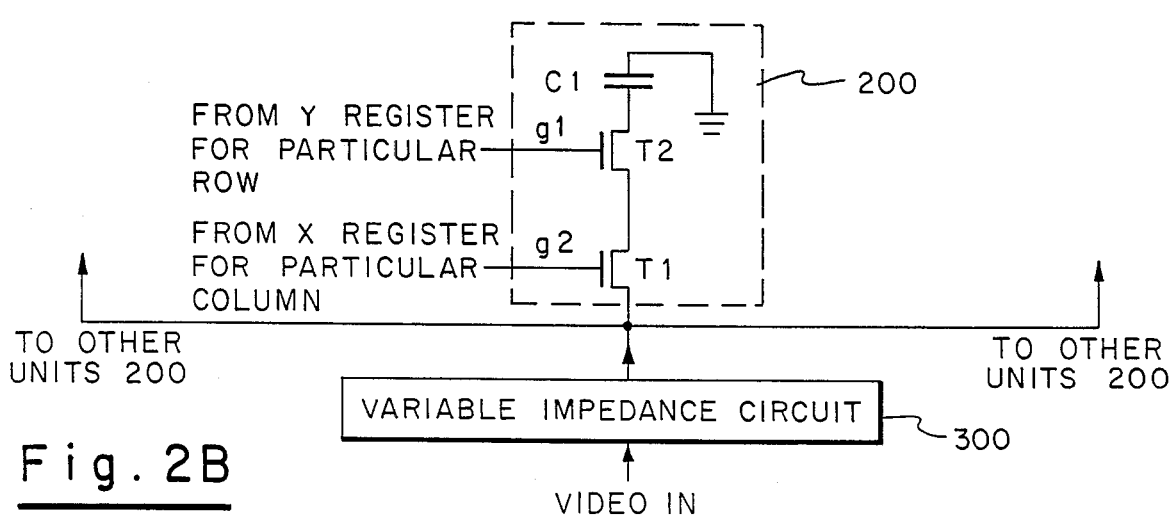
FIG. 2B is a diagram of an elemental unit of the array of FIG. 2A.

Referring to FIG. 2A, there is shown a diagram of an embodiment of the improvement of the present invention, as used in conjunction with one of the described types of display devices. An array of elemental units 200 are provided, each unit being identified by its x and y positions in the array, the x position representing the column and the y position representing the row of the unit in the array. A typical unit is illustrated in FIG. 2B, and is seen to include, in this embodiment, field effect transistors T1 and T2, coupled in series, with a capacitor C1 that represents the capacitance of the display region associated with the particular unit. The input video signal is coupled to the source electrode of transistor T1 via a variable impedance circuit 300 in accordance with the invention, and to be described hereinbelow. In order for the input signal to be applied to the display capacitor C1, both transistors T1 and T2 must be on. The gate electrodes of transistors T1 and T2 are respectively coupled to particular column and row outputs of an x shift register 210 and a y shift register 220. The y register 220 is clocked by a signal derived from the horizontal synchronizing signal, H, associated with the video signal to be displayed. The y register clock is labelled 221. The x register is clocked by system clock 211, which operates at the basic horizontal resolution element rate. The y register clock 221 is synchronized with the vertical synchronizing signal, V, associated with the video signal to be displayed, and the x register clock 211 is synchronized with the horizontal synchronizing signal. The gate electrodes g1 of each of the transistors T1 in the first column of units (x=1) are coupled to the output of the first stage of the x register 210 the gates g1 of each of the transistors T1 in the second column of units (x=2) are coupled to the output of the second stage of the x register 210, and so on. Similarly, the gates g2 of each of the transistors T2 in the first row of units (y=1) are coupled to the output of the first stage of the y register 210, the gates g2 of each of the transistors T2 in the second row of units (y=2) are coupled to the output of the second stage of the y register 210, and so on. In this manner, a "cross-point" type of addressing of the units in the array is achieved, so that the sampled video signal is applied to the appropriate unit of the array. It is noted that the particular type of addressing utilized is not, per se, a feature of the present invention, and alternative addressing schemes, such as the one described hereinbelow, or other approaches to addressing of the array units, can be used consistent with the principles of the present invention.

Figure 3:
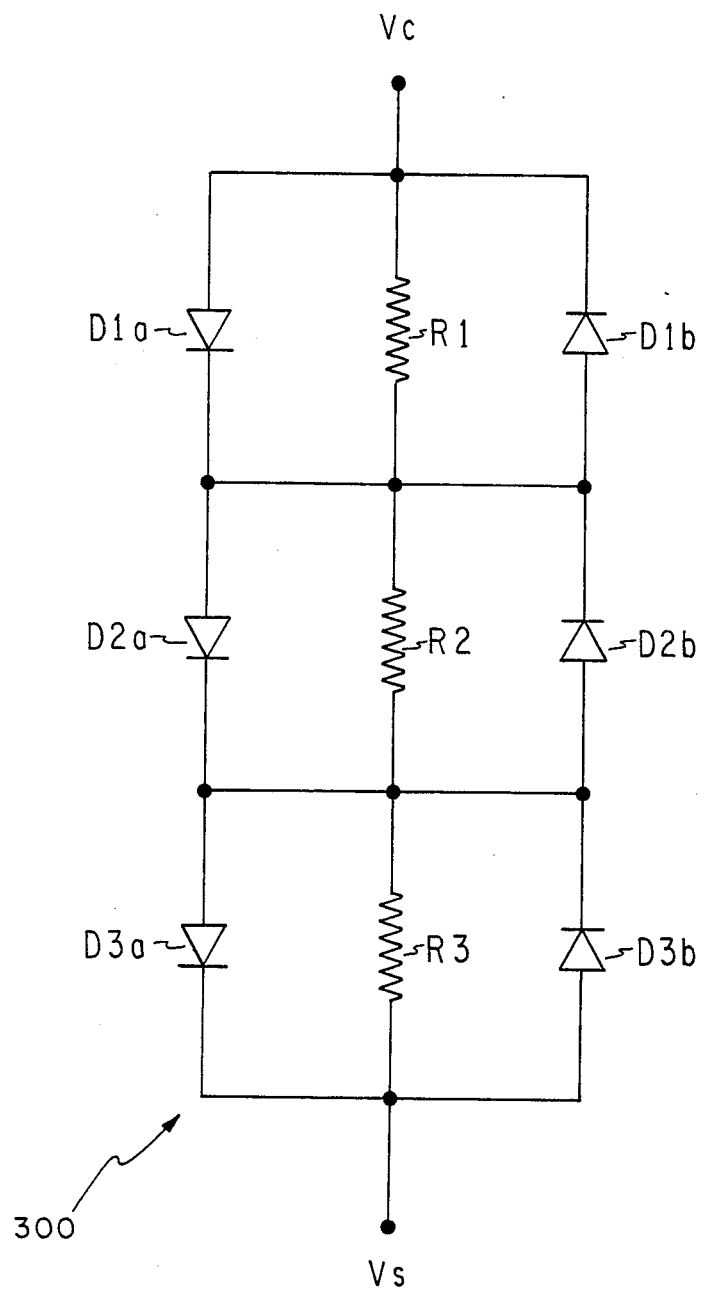
FIG. 3 is a circuit diagram of the variable impedance circuit of the FIG. 2 and FIG. 4 embodiments.

Referring to FIG. 3, there is shown a diagram of a variable impedance circuit 300 which can be utilized, in conjunction with the capacitance of the display region, to obtain a time constant that depends upon the difference between the voltage that is currently across the display region capacitor C1, and the input video signal voltage being applied. A plurality of resistors, R1, R2, and R3 are shown as being connected in a series arrangement. Connected across each resistor is a pair of back-to-back diodes. The diodes connected across resistor R1 are designated D1a and D1b, the diodes connected across resistor R2 are designated D2a and D2b, and the diodes connected across resistor R3 are designated D3a and D3b. In the diagram of FIG. 3, the signal voltage to be applied is designated as Vs, and the present voltage across C1 is designated as Vc.

Operation of the FIG. 3 circuit is as follows: Assume that R3 is much greater than R2 and that R2 is much greater than R1. With this arrangement, it will become understood that the desired relationship between time constant and relative voltage of the applied signal can be achieved. For example, assume that the "new" voltage, Vs, to be applied, is very close in value to the voltage Vc presently across the display region capacitance C1. In such case, there will not be sufficient voltage drop across any of the resistors (R1, R2 or R3) to exceed the inherent diode voltage drop and cause one of the diodes to conduct. This means that the total resistance, R1 plus R2 plus R3 will be in the circuit, thereby resulting in a relatively high RC time constant for charging (or discharging, depending on the polarity of the voltage difference) the display region capacitance C1. Assume next that the voltage being applied results in a voltage difference, (Vc−Vs) that is large enough to be greater than the inherent diode drop of one of the diodes D3a or D3b (depending upon polarity) across the resistor R3, but not sufficient to exceed the inherent diode drop voltages across the other two resistors (bearing in mind that R3 is the largest of the three resistors and will have the proportionately largest fraction of voltage drop thereacross). In such case, the resistive portion of the RC time constant will substantially be the sum of resistors R1 and R2, so the resultant time constant will be less than in the previously described case. In similar fashion, if there is even a greater voltage difference, (Vc−Vs), that is sufficient to cause the voltage drop across the second largest resistor (R2) to exceed the inherent diode drop necessary to also cause conduction of one of the diodes D2a or D2b (again, depending upon polarity), the result will be that substantially only the smallest resistor R1 will contribute to the RC time constant of the circuit, and so on. In this manner, it is seen that the desired relationship between time constant and voltage difference can be obtained, it being understood that the number and size of resistances and capacitances utilized will be determined by the specifications for a particular application. It is assumed that the impedance of the source, as well as stray capacitance, will also be taken into account in arriving at the circuit parameters.

Figure 4A:
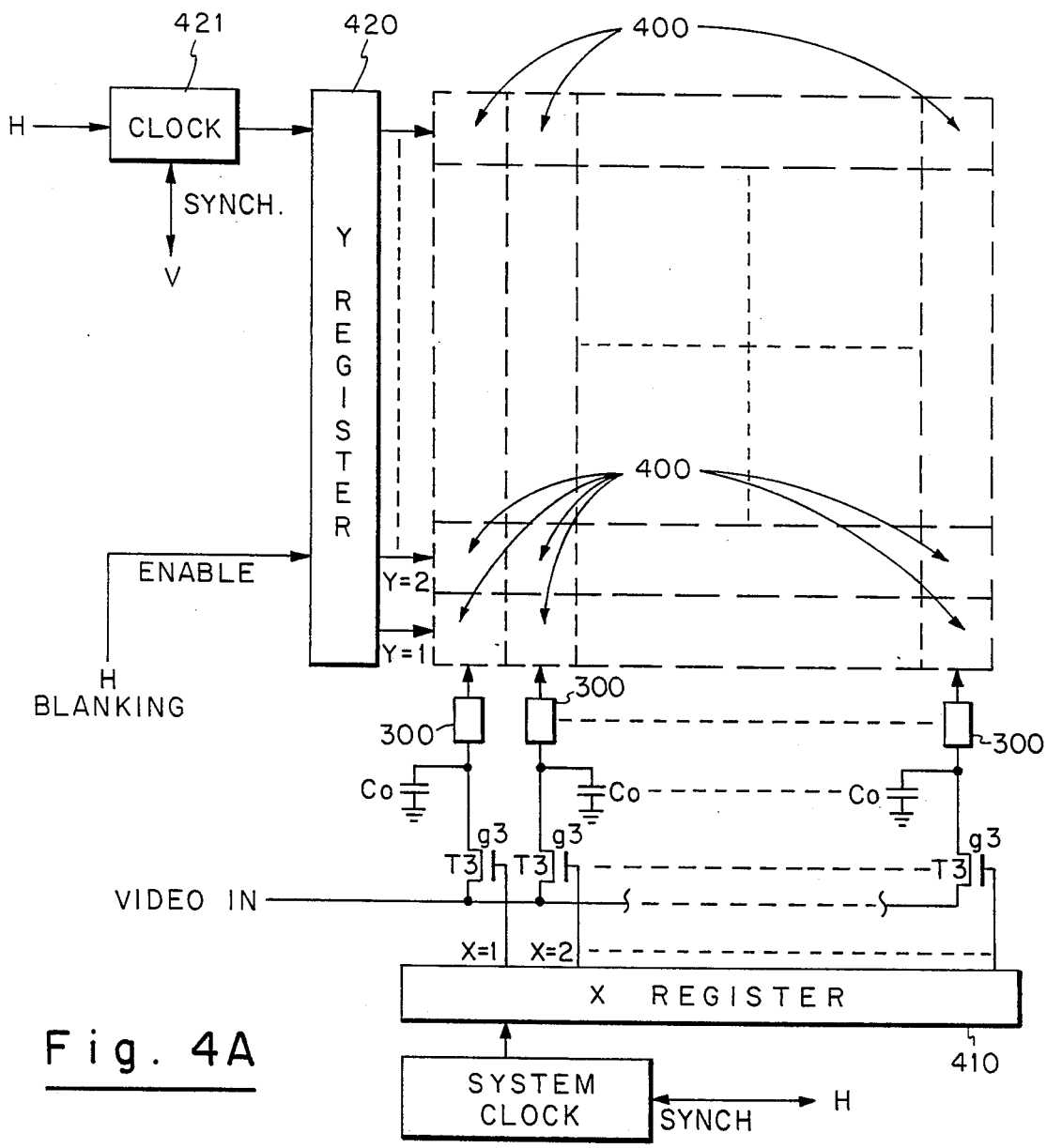
FIG. 4A is a diagram of an improved apparatus in accordance with another embodiment of the invention.
Figure 4B:
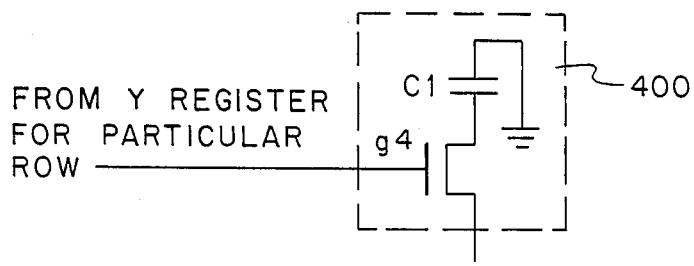
FIG. 4B is a diagram of an elemental unit of the array of FIG. 4A.

Referring to FIG. 4, there is shown another approach to addressing the individual units and coupling input signals thereto, in which the principles of the invention can be employed. In the FIG. 4 embodiment, a single field-effect transistor T4 (see FIG. 4B) is utilized at each unit 400 for gating the input signal into the unit's display region, again represented by C1. A y register 420, which operates in a manner similar to the y-register 220 of the FIG. 2 embodiment, and is clocked by a signal derived from the horizontal synchronizing signal, using a clock 421 which is synchronized with the vertical synchronizing signal. In this case, however, the y-register outputs are enabled to be present only during the horizontal blanking intervals. Also, as in the FIG. 2 embodiment, the gates (g4 in this case) of each transistor (T4 in this case) of the first row of units (y=1) are coupled to the output of the first stage of the y register 420, the gates g4 of each transistor T4 of the second row of units (y=2) are coupled to the output of the second stage of the y register 420, and so on.

In the FIG. 4 embodiment a sampled horizontal scanline of the input video is temporarily stored in temporary storage capacitors Co, each of which is under control of an associated field-effect transistor T3, there being one transistor/capacitor combination for each resolution element in a line (and corresponding to the number of stages in x-register 410). The input video signal is coupled to the source electrodes of each transistor T3. The outputs of the x-register stages are respectively coupled to the gate electrodes g3 of the transistors T3. The drain electrodes of transistors T3 are respectively coupled across capacitors Co to ground reference potential. Each capacitor potential is also coupled, via a respective variable impedance circuit 300, to the source electrodes of all transistors T4 in the respective array column (FIG. 4B). In operation, during the active portion of a horizontal line, the sampled video signal elements are clocked into the respective temporary storage capacitors Co as the transistors T3 are successively turned on by the outputs of the x register stages. During horizontal blanking, the outputs of y register 420 operate to turn on all of the transistors T4 of the row into which the scanline is to be input, thereby coupling the potential across each temporary storage capacitor to the storage region capacitance C1 of the unit in the respective column. The coupling is seen, in each case, to be via a variable impedance circuit of the type described in conjunction with FIG. 3. Accordingly, the time constant associated with application of the present sampled video signal level to each display region will again be a function of the difference between the present voltage across the display region capacitance and the "new" voltage to be applied.

The embodiment of FIG. 4 is seen to have a circuit 300 for each horizontal element, whereas the illustrated embodiment of FIG. 2 has the advantage of using only a single circuit 300. However, the embodiment of FIG. 4 has certain advantages, for example: there is only a single transistor at each array element; there is a longer time (a horizontal blanking period) during which the sampled charge can be transferred to the display region capacitance; and there is less stray capacitance to deal with than in the FIG. 2 embodiment.

The invention has been described with reference to particular preferred embodiments, but variations within the spirit and scope of the invention will occur to those skilled in the art. For example, the system can be used for monochrome or color applications. Also, the horizontal storage in the FIG. 4 embodiment can be implemented using charge coupled devices. Finally, it will be understood that the term "frame" as used herein in intended to mean one or more video fields.

I claim:

1. Apparatus for generating images represented by frames of input electronic video signals, comprising:
    frame storage means, having an array of semiconductor controlled storage units, for receiving and storing frames of video information as a pattern of stored charge;
    circuit means for applying the input video signals to respective storage units of said frame storage means, said circuit means having a variable time constant and being operatively to apply the input video signals to respective storage units of said frame storage means, said circuit means having a variable time constant and being operative to apply the input video signals to respective storage units with a time constant for each particular storage unit that depends upon the difference between the input video signal level being applied to said particular storage unit and the signal level stored at said particular storage unit; and means for converting the stored charge pattern into a viewable image.

2. Apparatus as defined by claim 1, wherein said time constant of said circuit means is in an inverse relationship to the difference between the input signal level being applied to said particular storage unit and the signal level stored at said particular storage unit.

3. Apparatus as defined by claim 1, wherein said means for converting the store charge pattern into a viewable image includes a material having a characteristic which is affected by said stored charge pattern, and an optical subsystem operatively coupled with said material for generating a viewable image.

4. Apparatus as defined by claim 2, wherein said means for converting the stored charge pattern into a viewable image includes a material having a characteristic which is affected by said stored charge pattern, and an optical subsystem operatively coupled with said material for generating a viewable image.

5. Apparatus as defined by claim 3, wherein said material is a deformable material which is deformed by said stored charge pattern.

6. Apparatus as defined by claim 4, wherein said material is a deformable material which is deformed by said stored charge pattern.

7. Apparatus as defined by claim 3, wherein said optical subsystem is a Schleiren optical system.

8. Apparatus as defined by claim 5, wherein said optical subsystem is a Schleiren optical system.

9. Apparatus as defined by claim 6, wherein said optical subsystem is a Schleiren optical system.

10. Apparatus as defined by claim 1, wherein each of said semiconductor-controlled storage units includes a storage element and at least one semiconductor switch and wherein said storage element is electrically capacitive.

11. Apparatus as defined by claim 2, wherein each of said semiconductor-controlled storage units includes a storage element and at least one semiconductor switch and wherein said storage element is electrically capacitive.

12. Apparatus as defined by claim 9, wherein each of said semiconductor controlled storage units includes a storage element and at least one semiconductor switch and wherein said storage element is electricallly capacitive.

13. Apparatus as defined by claim 1, wherein said circuit means has a resistance and is operative to vary its effective time constant by varying the resistance through which the input video signals are applied to said each storage unit.

14. Apparatus as defined by claim 7, wherein said circuit means has a resistance and is operative to vary its effective time constant by varying the resistance through which the input video signals are applied to said each storage unit.

15. Apparatus as defined by claim 8, wherein said circuit means has a resistance and is operative to vary its effective time constant by varying the resistance through which the input video signals are applied to said each storage unit.

16. Apparatus as defined by claim 9, wherein said circuit means has a resistance and is operative to vary its effective time constant by varying the resistance through which the input video signals are applied to said each storage unit.

17. Apparatus as defined by claim 10, wherein said circuit means includes a plurality of resistors coupled in series, and a pair of back-to-back diodes coupled across each resistor.

18. Apparatus as defined by claim 11, wherein said circuit means includes a plurality of resistors coupled in series, and a pair of back-to-back diodes coupled across each resistor.

19. Apparatus as defined by claim 12, wherein said circuit means includes a plurality of resistors coupled in series, and a pair of back-to-back diodes coupled across each resistor.

20. Apparatus as defined by claim 13, wherein said circuit means includes a plurality of resistors coupled in series, and a pair of back-to-back diodes coupled across each resistor.

21. Apparatus as defined by claim 1, wherein said circuit means includes means for sampling the input video signals and for sequentially applying said sampled video signals to said respective storage units of the frame storage means.

22. Apparatus as defined by claim 21, wherein the time constant of said circuit means is in an inverse relationship to the difference between the sampled signal level being applied to said particular storage unit and the signal level stored at said particular storage unit.

* * * * *